(12) United States Patent
Dannoux et al.

(10) Patent No.: US 7,070,728 B2
(45) Date of Patent: Jul. 4, 2006

(54) DIESEL FILTER PLUGGING PROCESS

(75) Inventors: Thierry Luc Alain Dannoux, Avon (FR); Jean-Pierre Henri René Lereboullet, Paris (FR); Grégory Emmanuel Guillaume Rossignol, Paris (FR); Claude Jacques Julien Vanotti, Ponthierry Saint Fargeau (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/101,118

(22) Filed: Apr. 7, 2005

(65) Prior Publication Data

US 2005/0172591 A1    Aug. 11, 2005

(30) Foreign Application Priority Data

Nov. 24, 2003 (EP) .................................. 03292904
Mar. 3, 2004 (EP) .................................. 04290575

(51) Int. Cl.
*B28B 11/00* (2006.01)
*B01D 46/00* (2006.01)

(52) U.S. Cl. ............... 264/294; 264/628; 264/630; 264/638; 264/210.1; 264/210.3; 264/299; 264/DIG. 48; 55/282.2; 55/282.3; 55/523; 55/DIG. 5; 55/DIG. 10; 55/DIG. 30; 60/311; 425/383

(58) Field of Classification Search ............... 55/282.2, 55/282.3, 385.3, 523, DIG. 5, DIG. 10, DIG. 30; 264/628, 630, 631, 638, 177.12, 209.3, 210.1, 264/210.2, 210.3, 294, 299, DIG. 48; 60/282, 60/297, 299, 311; 428/116, 117, 118; 502/439; 425/335, 340, 343, 383, 402, 403
See application file for complete search history.

(56) References Cited

U.S. PATENT DOCUMENTS

| 4,283,210 A | 8/1981 | Mochida et al. |
|---|---|---|
| 4,411,856 A | 10/1983 | Montierth |
| 6,005,143 A | 12/1999 | Machado et al. |
| 6,863,705 B1* | 3/2005 | Ishihara et al. ............... 55/523 |
| 2004/0206061 A1* | 10/2004 | Ichikawa ..................... 55/523 |
| 2004/0206062 A1* | 10/2004 | Ichikawa ..................... 55/523 |

FOREIGN PATENT DOCUMENTS

| EP | 0 042 300 | 4/1984 |
|---|---|---|
| EP | 0 226 306 | 5/1991 |
| EP | 0 692 995 | 7/1997 |
| EP | 0 692 995 B1 * | 7/1997 |
| JP | 2003-260316 | * 9/2003 |

* cited by examiner

*Primary Examiner*—Jason M. Greene
(74) *Attorney, Agent, or Firm*—Kees van der Sterre (57) ABSTRACT

A method for plugging a subset of cells of a honeycomb structure having a plurality of open-end cells extending therethrough including providing at least one cylindrically-shaped first roller including an engagement surface having a plurality of outwardly-extending teeth spaced along a length and about a circumference of the at least one first roller, wherein the teeth are spaced so as to engage a first subset of a total number of cells exposed on a first end of the honeycomb structure. The method also includes rolling the engagement surface of the at least one first roller across the first end of the honeycomb structure with the teeth extending into the first subset of cells, thereby deforming the first end of the honeycomb structure and plugging a second subset of the total number of cells substantially different from the first subset of cells.

15 Claims, 9 Drawing Sheets

DIESEL FILTER PLUGGING PROCESS

BACKGROUND OF THE INVENTION

This invention relates to charging flowable materials into selected cells of a honeycomb structure and, more particularly, to a method and apparatus for selectively manifolding, i.e., plugging, cells of a honeycomb structure for the fabrication of ceramic filter bodies and other selectively sealed honeycomb structures, such as particulate traps for diesel engines.

Honeycomb structures having traverse cross-sectional cellular densities of approximately one tenth to one hundred cells or more per square centimeter have several uses, including solid particulate filter bodies and stationary heat exchangers. Such uses require selected cells of the structure to be sealed or plugged by manifolding and the like at one or both of the respective ends thereof. The term "sealed" and other corresponding grammatical forms, i.e., sealant, sealing, etc., are used herein to refer to both porous and non-porous methods of closing the open transverse cross-sectional areas of cells.

Figure 1:
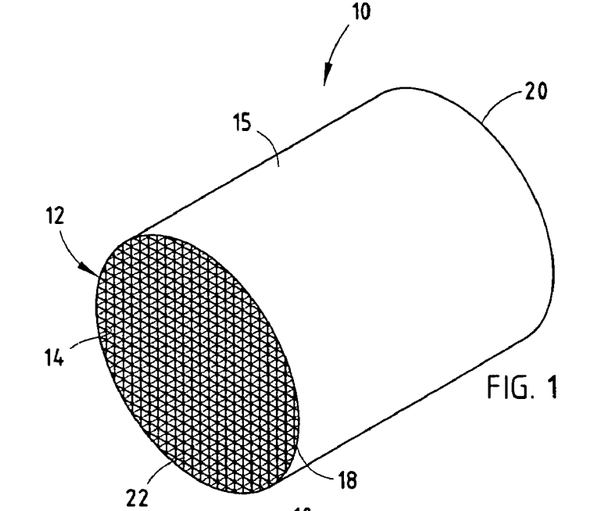
FIG. 1 is a perspective view of an extruded filter body including a first end having a plurality of open-ended cells.
Figure 2:
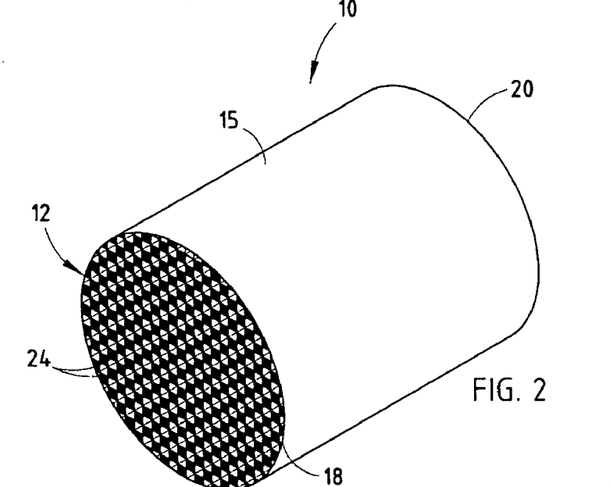
FIG. 2 is a perspective view of the extruded filter body, wherein a first subset of the cells are open-ended, and a second subset of the cells are plugged.
Figure 3:
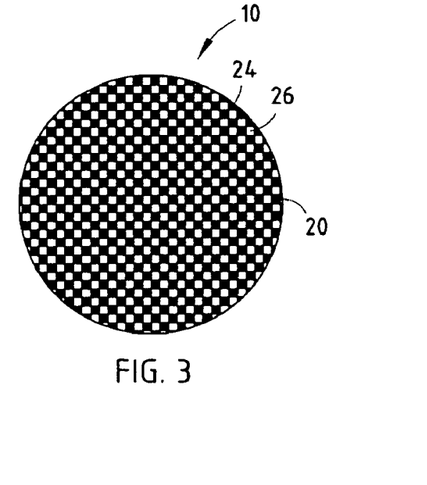
FIG. 3 is a side view of the filter body including a second end, wherein the first subset of the cells are plugged and a second subset of the cells are open-ended.

The reference numeral 10 (FIG. 1) generally designates a solid particulate filter body that is generally well known and that may be fabricated utilizing a honeycomb structure 12 formed by a matrix of intersecting, thin, porous walls 14 surrounded by an outer wall 15, which in the illustrated example is provided a circular cross-sectional configuration. The walls 14 extend across and between a first end face 18 and an opposing second end face 20, and form a large number of adjoining hollow passages or cells 22 which also extend between and are open at the end faces 18, 20 of the filter body 10. To form the filter 10 (FIGS. 2 and 3), one end of each of the cells 22 is sealed, a first subset 24 of the cells 22 being sealed at the second end face 20, and a second subset 26 of the cells 22 being sealed at the first end face 18 of the filter 10. Either of the end faces 18, 20 may be used as the inlet face of the resulting filter 10.

In operation, contaminated fluid is brought under pressure to an inlet face and enters the filter 10 via those cells which have an open end at the inlet face. Because these cells are sealed at the opposite end face, i.e., the outlet face of the body, the contaminated fluid is forced through the thin porous walls 14 into adjoining cells which are sealed at the inlet face and open at the outlet face. The solid particulate contaminant in the fluid, which is too large to pass through the porous openings in the walls, is left behind and a cleansed fluid exits the filter 10 through the outlet cells and is ready for use.

For the mass production of such filters and heat exchangers, it is highly desirable to be able to seal selected cells ends as rapidly and as inexpensively as possible. A well-known method of fabricating filter bodies is to manifold or plug the end of each cell individually with a hand held, single nozzle, air actuated gun. The hand held plugging of individual cells by this process is long and tedious and is not well suited for the commercial production of such filters, heat exchangers, and other honeycomb structures which have thousands of cells to be selectively sealed.

Another known method of plugging includes the use of a mask having a number of openings extending therethrough for selectively manifolding honeycomb structures in the fabrication of solid particulate filter bodies. These masks typically include a rigid plate having a number of bores extending therethrough.

Masks have also been formed for manifolding cells which are regularly interspaced among substantially mutually parallel rows and substantially mutually parallel columns at an open face of a honeycomb structure by applying strips of an adhesive backed flexible webbing impermeable to the sealed material, such as masking tape, over selected rows and columns of cells. Alternatively, these masks are created by providing a matrix of spaced, overlaid strips of resilient, impermeable and reusable material such as metal foil, which are then joined together and fitted, with or without an underlying gasket, over the open surface of the structure with the openings through the matrix and gasket positioned opposite the cells to be charged. By providing a honeycomb structure with cells arranged in mutually parallel rows and mutually parallel columns and covering alternative rows and alternate columns of cells with strips of a suitable flexible material such as the masking tape or the joined thin metal strips, the open ends of one-half of a subset of cells arranged in a checkered pattern across the open face are exposed. After filling the ends of these strips, the strips are removed and strips are applied covering the remaining alternate rows and remaining alternate columns, thereby exposing the open ends of the remaining half of the subset of cells of the checkered pattern at the end face for filling. Both embodiments provide greater flexibility in dealing with the surface height variations and provide better masking of the cell ends not to be charged, including those which may be damaged, than does the rigid plate embodiment. However, both embodiments must typically be applied twice to each end face. This is a significant limitation with respect to the tape strips which must be individually applied across each end face, a time consuming task. The reusable matrix and gasket of the second embodiment may be more quickly applied and removed, but like the rigid plate embodiments, is less easily adapted to distortions in the cell locations at the end faces. Moreover, increasing cellular densities render such an approach unworkable.

In another approach, the rigid plate is provided with a plurality of bores extending therethrough to register with the open ends of alternate cells of a honeycomb structure. Each bore is fitted with a short filling tube which protrudes from the face of the plate and into a cell when the plate is aligned over the open cell ends of the honeycomb structure. A sealing material is forced from the opposing face of the plate through the bores and into the cell ends receiving the tubes. However, this approach is inflexible, a limitation which becomes increasingly significant when cell densities in the honeycomb structure are increased and distortions in the locations of the cell walls become relatively more severe. The rigid construction of this approach also damages brittle honeycomb structures.

In yet another approach, rigid rivets are attached at regular intervals along the length of thin flexible strips and run along alternate diagonals of cells arranged in mutually parallel rows and mutually parallel columns, wherein each rivet is inverted into and covers the open end of the cell along the diagonal. As a result, half of the cells exposed at an end surface of the honeycomb structure are covered in a checkered or checkerboard pattern and the open ends of the remaining cells are filled in a single sequence of steps. The strip-backed rivets are more flexible but require more handling than either of the plate embodiments discussed above, thereby lessening their appeal for use in selectively large honeycomb structures on a commercial basis.

In still yet another approach, plates containing a plurality of spaced apart spherically-shaped bearings are pressed against the ends of the filter. The bearings are spaced at intervals so as to engage alternate cells. The shape of the bearings causes the walls of the alternate cells to collapse inwardly towards one another, thereby sealing the ends of the cells not occupied by the bearings. However, significant forces are required to "crush" the walls sufficiently, the application of which may cause unintentional deformation of the filter, such as shearing of the ends of the walls. Further, a suctioning force generated between the bearings and the filter makes the bearing-containing plate difficult to disengage from the filter, and again may result in unintentional deformation of the filter.

A method for manifolding or plugging extruded honeycomb structures, such as ceramic particulate traps for diesel engines, is desired that is highly repeatable and accurate, while simultaneously having a short cycle time. The method should also be easily applied, be adapted to non-uniform cell patterns, and reduce unintended deformations of the desired structure.

SUMMARY OF THE INVENTION

One aspect of the present invention is to provide a method for plugging a subset of cells of a honeycomb structure having a plurality of open end cells extending therethrough, including providing at least one cylindrically-shaped first roller including an engagement surface having a plurality of outwardly-extending teeth spaced along a length and about a circumference of the at least one first roller, wherein the teeth are spaced so as to engage the first subset of a total number of cells exposed on a first end of a honeycomb structure. The engagement surface of the at least one first roller across the first end of the honeycomb structure with the teeth extending into the first subset of cells, thereby deforming the first end of the honeycomb structure and plugging a second subset of the total number of cells substantially different from the first subset of cells.

The present inventive method is highly accurate and repeatable, may be completed in a relatively short cycle time, is relatively easy to perform, and is adaptable to non-uniform cell patterns. The method further reduces unintentional deformations of the desired structure, reduces manufacturing costs, is efficient to use, and is particularly well-adapted for the proposed use.

These and other advantages of the invention will be further understood and appreciated by those skilled in the art by reference to the following written specification, claims and appended drawings.

DETAILED DESCRIPTION OF THE PREFERRED EMBODIMENTS

Figures 4, 5, 6, 7:
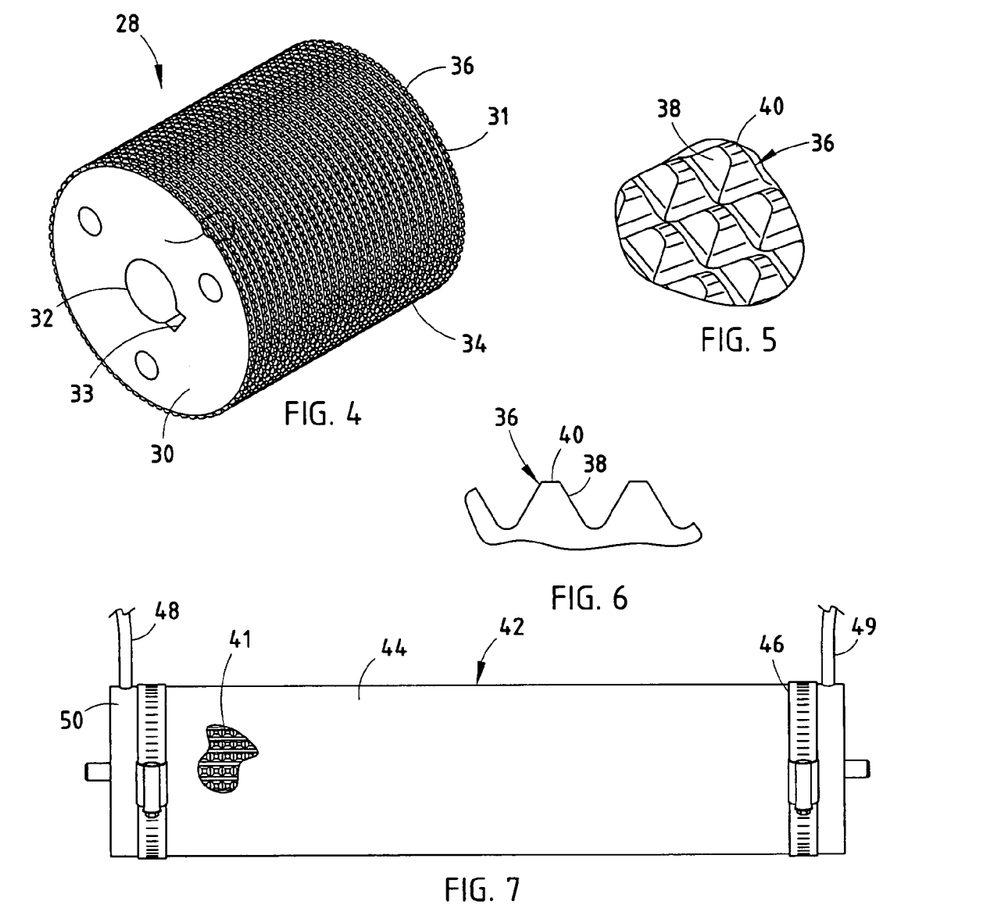
FIG. 4 is a perspective view of a roller utilized to manifold or plug the first and second subsets of the cells.
FIG. 5 is an enlarged, perspective view of a plurality of teeth of the roller illustrated in FIG. 4.
FIG. 6 is an enlarged, cross-section view of an alternative embodiment of the teeth.
FIG. 7 is a perspective view of a mold housing utilized to construct the roller.

For purposes of description herein, the terms "upper," "lower," "right," "left," "rear," "front," "vertical," "horizontal," and derivatives thereof shall relate to the invention as oriented in FIG. 4. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 28 (FIG. 4) generally designates a roller utilized to manifold or plug the ends of the filter body 10. The roller 28 includes opposing ends 30, 31 a centrally-located shaft-receiving bore 32 extending therebetween, a key slot 33, and a cylindrically-shaped outer engagement surface 34. The engagement surface 34 includes a plurality of outwardly-extending teeth 36 (FIGS. 5 and 6) spaced along the length and circumference thereof. Preferably, the teeth 36 are equally spaced along the length and about the circumference of the engagement surface 34. However, the roller 28 may be constructed such that the spacing of the teeth 36 varies along the length and/or about the circumference of the roller 28 in order to, for example, compensate for filter body deformation due to drying. Each tooth 36 includes four intersecting side walls 38 that cooperate to form a pyramidal-type shape, and a tip 40. Preferably, the tip 40 is provided with a radius and employs a bottom radius between and linking adjacent teeth which varies from about 0.05 mm to about 0.03 mm. However, the tip 40 may also be provided in a substantially planar configuration, as best illustrated in FIG. 6. The engagement surface 34 is preferably manufactured via an electro discharge machining process, and is preferably constructed of stainless steel, and more preferably constructed of stainless steel ISO316L. The engagement surface 34 is further preferably coated with a 6 micron thick layer of a non-stick material, such as Nuflon™ as available from APS of Marvue la Vallée, France, which is deposited on the engagement surface 34 at approximately 390° C.

Figure 8:
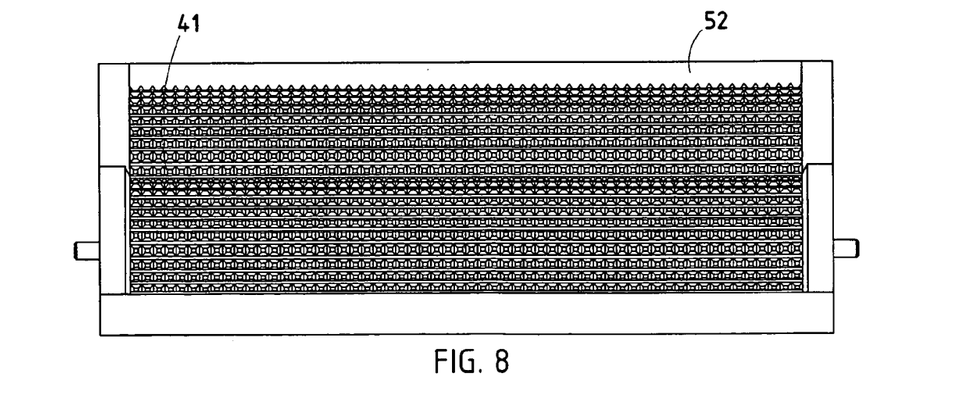
FIG. 8 is a front view of roller mold partially removed from within the mold housing.
Figure 9:
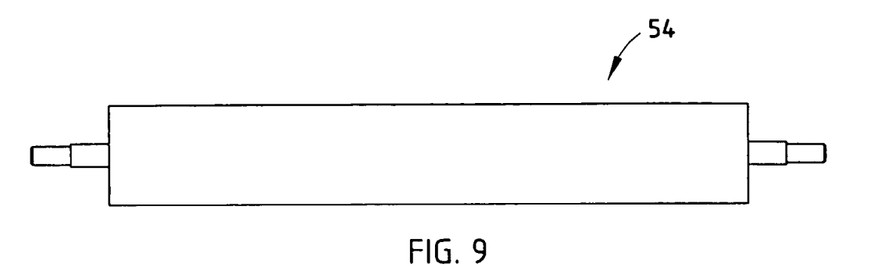
FIG. 9 is a top view of a blank or smooth roller.
Figure 10:
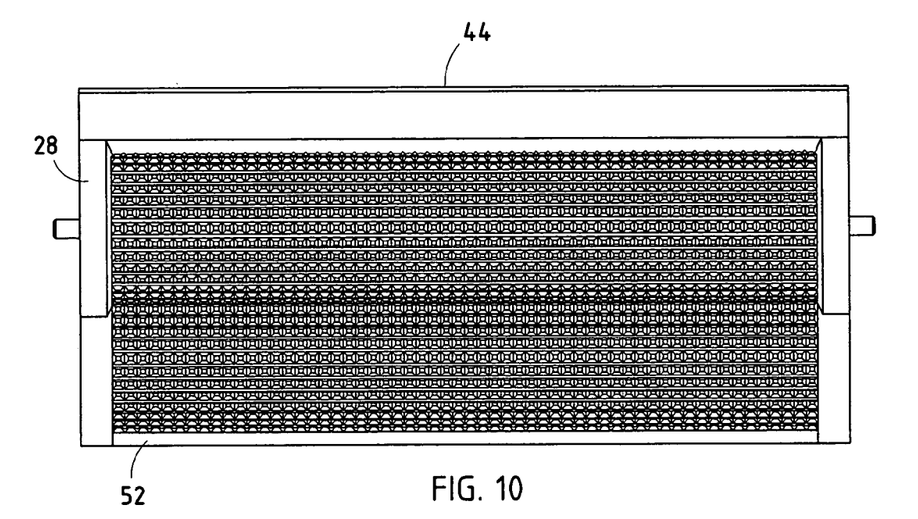
FIG. 10 is a front view of the roller located within the mold housing subsequent to the molding of a plurality of teeth on an outer surface thereof.

The roller 28 is constructed by inserting a master roller 41 (FIG. 7) to be replicated within a molding housing 42. The molding housing 42 includes a rolled metallic foil 44 and a pair of securing ring assemblies 46. The thickness of the foil is preferably within the range of between 0.10 mm and 0.15 mm thick, thereby providing sufficient flexibility, while the gap between the teeth of the master roller 41 and the foil 44 is preferably about 4 mm. The rings are tightly adjusted to the arbor diameter to ensure concentricity thereto. An injection tube 48 is securely fixed to an injection aperture 50 that is in fluid communication with a cavity formed between the teeth of the master roller 41 and the surrounding foil 44. A venting tube 49 is secured on the ring 46. A resin, such as a silicone RTV, is then injected into the cavity and then cured for approximately 6 hours at 50° C. The foil 44 is preferably coated with a primer, thereby allowing the resin to sufficiently adhere to the foil 44, and to the Nuflon™ coated outer surface of the master roller 41. After curing, the securing ring assemblies 46 are removed and the foil 44 is removed from about the newly-formed roller mold 52 (FIG. 8). A longitudinally-extending incision is made on a non-active area of the roller mold 52, and the roller mold 52 is removed from about the master roller 41. A blank smooth roller 56 (FIG. 9) is then placed within the molding housing 42, and the roller mold 52 and the foil 44 are secured via the securing ring assemblies 46, thereby securely holding the roller 56 within the molding housing 42. A second or overmolding resin is then inserted into the cavity formed between the roller mold 52 and the roller 54. Preferably, the second polymer results in a rigid structure, such as epoxy CY219, as available from Araldite of Sodiema, France. Silicone grease is used on the active areas of the roller mold 52 and securing ring assemblies 46 to prevent adhesion of the second epoxy thereto. Preferably, the second resin is injected into the molding housing 42 under a vacuum pressure in order to avoid trapping air bubbles therein. The foil 44 (FIG. 10) and the roller blank 42 are then removed from about the newly-formed roller 28.

Figure 11:
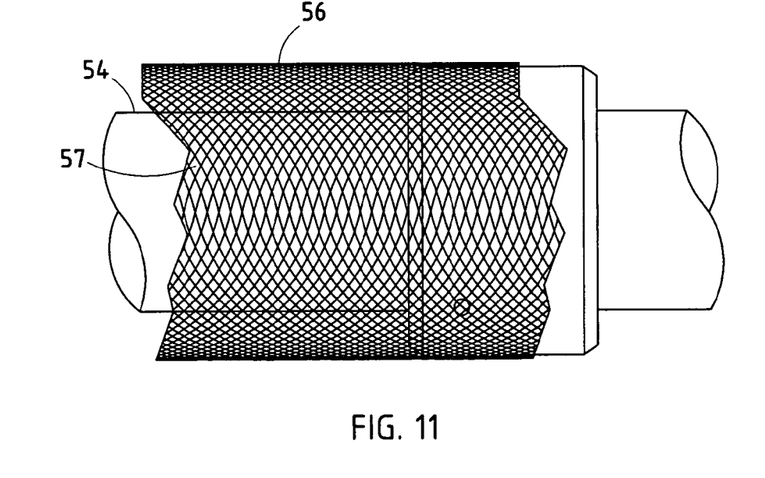
FIG. 11 is a front view of an alternative embodiment of the mold housing.

In an alternative method of forming the roller 28, the foil 44 is replaced with an expanded metal sheet 56 (FIG. 11) having a plurality of diamond-shaped apertures 57 and that allows a small length change of each of the resulting teeth without adversely effecting the width thereof. This method provides for a slightly larger pitch to the newly-formed roller as compared to the master roller.

In another alternative embodiment, a deformable roller is formed by using a non-rigid resin as the second resin, such as a polyurethane or epoxy plasticized with an urethane function. In operation, an internal double screw, or any other active element, can be utilized to change the total length of the roller. This change in overall length can be operated at any time, even while the plugging operation is being completed, thereby allowing the roller to be dynamically fit to the specific cell pattern. Preferably, the adjustability of the total roller length is less than or equal to 1.0%.

The reference numeral 60 (FIGS. 12–14) generally designates a manually-operated plugging apparatus. The plugging apparatus includes a frame 62 having a first U-shaped portion 64 and a second U-shaped portion 66. Each portion 64, 66 includes a bottom frame member 68 and a pair of vertically-extending side frame members 70 extending upwardly from the ends of the associated bottom frame member 68. The first portion 64 and second portion 66 of the frame 62 are operably coupled via a plurality of threaded adjustment bolts 72 that extend between the bottom frame members 68 and the side frame members 70 thereof. Each portion 64, 66 rotatably supports a roller 28 on an axle 74 extending between the associate side frame members 70. Each roller 28 is axially shiftable along a length of the associated axle 74, thereby allowing proper alignment between the teeth 36 and the cells 22 of the filter body 10. Each portion 64, 66 also includes a pair of gears 76 that are located at opposite ends of each axle 74 and are rotatably coupled thereto, and a pair of linear gears 78 having a plurality of teeth 80 extending along the length thereof and configured to cooperate with the teeth 77 of the gears 76. The linear gears 78 are slidably received within channels 82 extending along the length of each side frame member 70 of each portion 64, 66. The first portion 64 includes a graspable dial or knob 85 that is fixed for rotation with and at an end of the axle 74. A filter body cradle 84 having an upwardly exposed, arcuately-shaped receiving surface 86 is fixedly attached to each of the linear gears 78 of the portions 64, 66.

Figure 12:
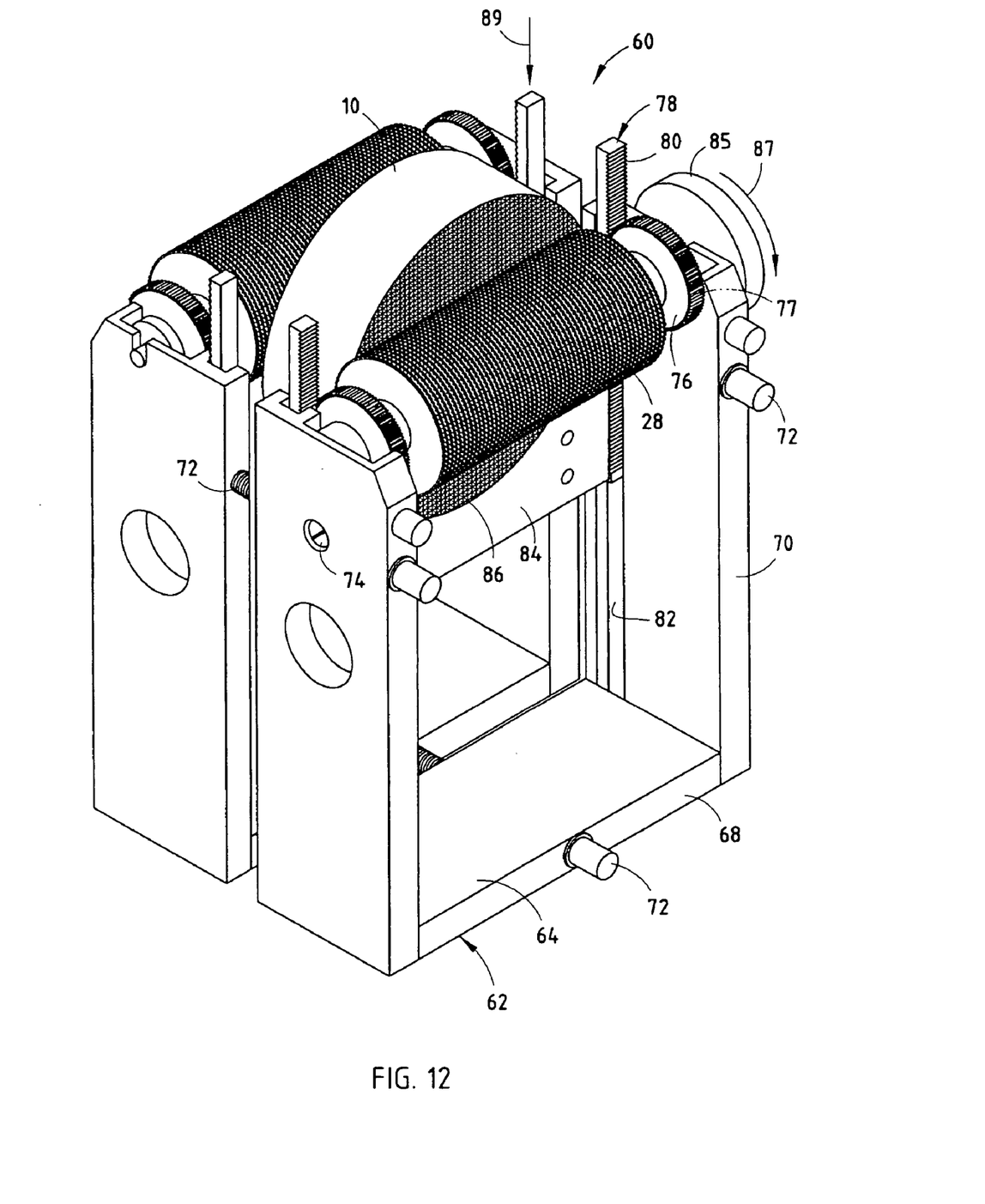
FIG. 12 is a perspective view of a plugging apparatus.
Figure 13:
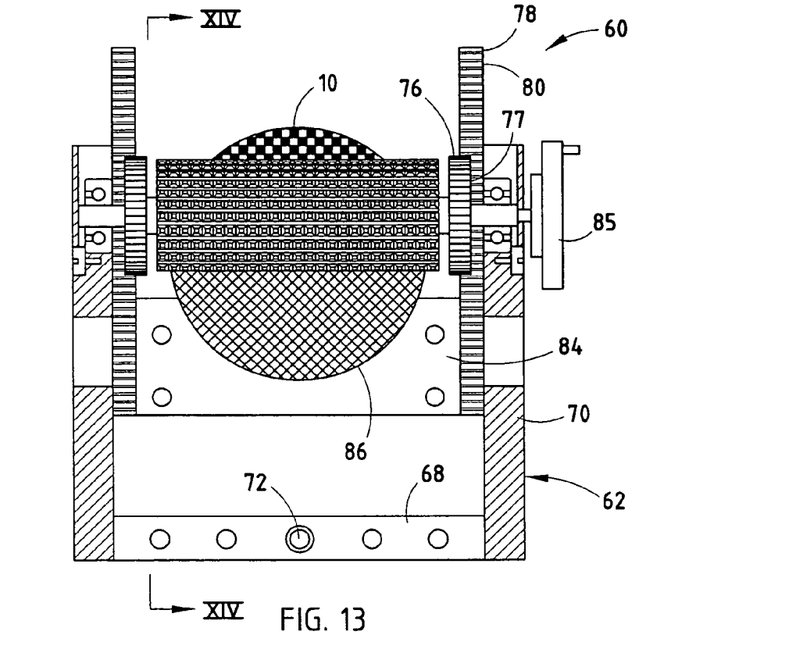
FIG. 13 is a cross-sectional front view of the plugging apparatus illustrated in FIG. 12.
Figure 14:
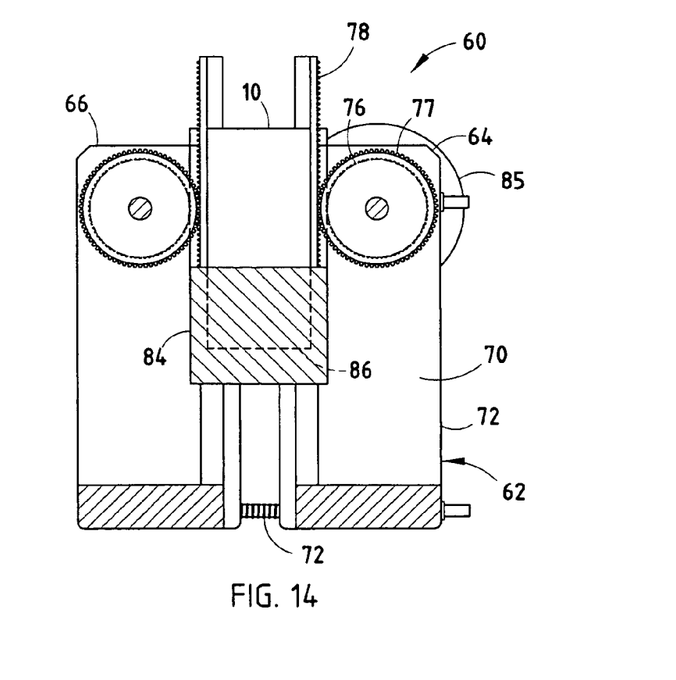
FIG. 14 is a cross-sectional side view of the plugging apparatus illustrated in FIGS. 12 and 13.

In operation, the filter body 10 is placed within the plugging apparatus 60, such that the outer wall 16 of the filter body 10 rests on the surface 86 of the cradle 84. The distance between the first portion 64 and the second portion 66 of the frame 62 is then adjusted via adjustment bolts 72 to accommodate the overall length of the filter body 10. The roller 28 associated with the first portion 64 of the frame 62 is aligned with the filter body 10, such that the teeth 36 of the roller 28 are aligned with the first subset 24 of the cells 22 of the filter body 10. The roller 28 associated with the second portion 66 of the frame 62 is offset in alignment from the roller 28 of the first portion 64 by the width of a tooth 36 in both the vertical and horizontal directions, thereby aligning the teeth 36 of the roller 28 associated with the second portion 66 with the second subset 26 of the cells 22 of the filter body 10. The rollers 28 associated with the first portion 64 and the second portion 66 of the frame 62 are transversed across the first and second end faces 18, 20 of the filter body 10, respectively, by turning the dial 85 in a direction as indicated by directional arrow 87, thereby causing the teeth 77 of the gears 76 to engage the teeth 80 of the associated linear gears 78, and the cradle 84 to move in a vertical direction as indicated by directional arrow 89. Although the illustrated plugging apparatus 60 includes a pair of laterally-spaced rollers 28, it should be noted that a single roller may be utilized while abutting the opposite end of the filter body against a stationary surface or stop member, and further that the apparatus may also be oriented such that the cells 26 of the filter body 10 are vertically oriented. It should further be noted that the filter body 10 is preferably positioned within the horizontally oriented cradle 84 such that the walls 14 of the filter body 10 are angled with respect to the horizontal and vertical directions, thereby reducing deformation of the walls 14 due to gravitationally induced-sagging.

Figure 15:
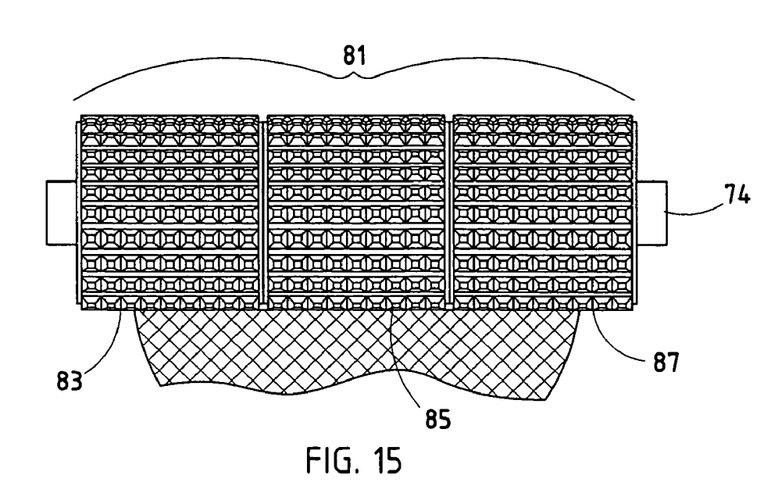
FIG. 15 is a front elevational view of an alternative embodiment roller.

Alternatively, each single roller 28 is replaced with a plurality of rollers 81 (FIG. 15). In the illustrated example, each single roller 28 is replaced with three rollers 83, 85, 87 that are each axially shiftable along a length of the associated axle 74. During operation, each of the rollers 83, 85, 87 is able to reach a proper alignment with the cells 22 of the filter body in a particular area of each of the end faces 18, 20, thereby allowing for proper alignment with the cells 22 in that particular area should the spacing and/or location of the cells 22 vary across either of the end faces 18, 20.

In an alternative embodiment, the filter body 10 is subjected to a water vapor atmosphere at approximately 90° C., thereby softening the walls 14 prior to the ends 30 of the filter body 10 being contacted by the rollers 28, and reducing unwanted deformation of the walls 14 such as shearing or cracking. In a related alternative embodiment each end face 18, 20 is brushed with a water saturated sponge tissue, and is subsequently rolled with the rollers 28 preferably within the range of about twenty seconds to about one minute after the sponge has been applied.

Figure 16:
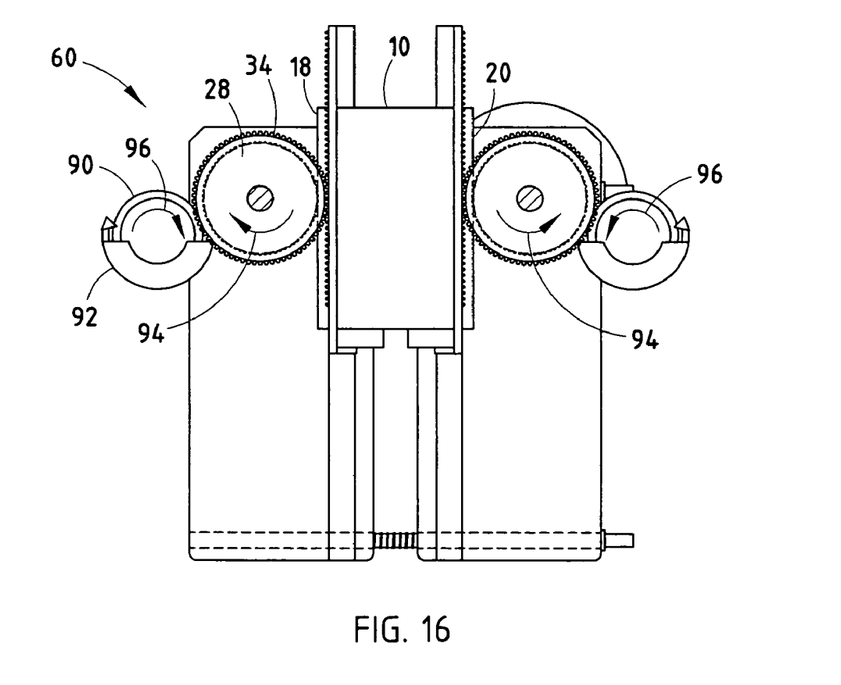
FIG. 16 is a side view of a first alternative embodiment of the plugging apparatus, wherein the apparatus includes slurry rollers.
Figure 17:
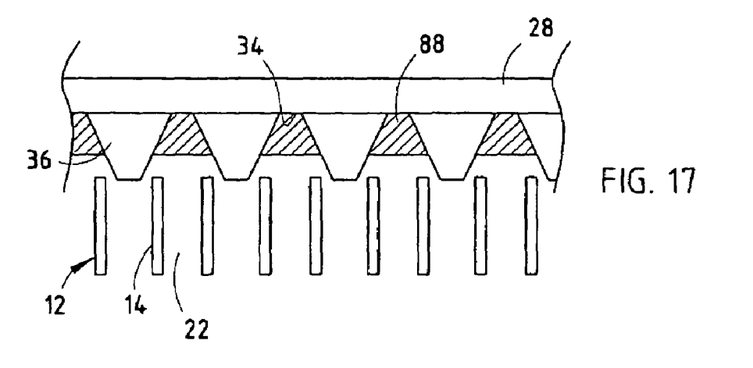
FIG. 17 is an enlarged side view of the roller coated with a slurry layer.
Figure 18:
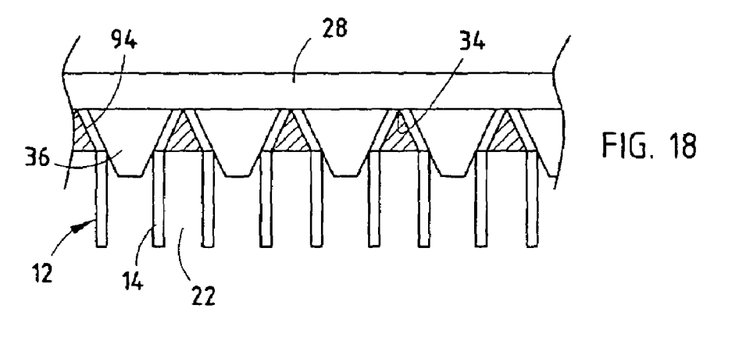
FIG. 18 is an enlarged side view of the roller applying the slurry layer to an end of the cells of the filter body.

In another alternative embodiment, an inking slurring layer 88 (FIGS. 16–18) is applied to each end face 18, 20 of the filter body 10 to increase the plugs resulting from the plugging process. In the illustrated example, the plugging apparatus 60 is provided with a pair of slurry rollers 90 that apply the slurry layer 88 to the rollers 28 prior to the rollers 28 contacting the end faces 18, 20 of the filter body 10. Specifically, a slurry, preferably comprised of a diluted ceramic solution, is provided to a pair of troughs 92 that encapsulate a lower portion of each of the rollers 28, respectively. As each of the rollers 28 are turned in a direction as indicated and represented by directional arrows 94, the slurry rollers 90 are rotated in a direction indicated and represented by directional arrows 96. The slurry as contained with the troughs 92 is transferred by the slurry rollers 90 to the engagement surface 34 of each of the rollers 28, and subsequently to the end faces 18, 20 of the filter body 10. More specifically, the slurry layer 88 is forced between the teeth 36 and into the ends of the cells 22 not occupied by the teeth 36, thereby providing extra material and increasing the thickness of the resultant end plugs 94. Preferably, each roller 28 is continuously coated with between about 0.5 and 1.5 mm, preferably about a 1.2 mm layer of a diluted ceramic material, however, other suitable materials may be substituted therefor. Alternatively, the slurry solution may be added directly to the end face 18 and 20 of the filter body 10 via a bar-coating process, and subsequently rolled with rollers 28. Both methods employing the slurry rollers 90 and the bar-coating process are preferably completed in a single step, however, the end plugs 94 may be gradually increased in thickness by applying several thin layers of slurry. A slurry layer having a thickness within a range of between 100 μm and 150 μm is preferable if multiple layers of the slurry are applied. It is also preferable that the end faces 18, 20 are at least partially dried after the application of each layer.

In another alternative embodiment, a smooth roller (not shown) may be applied to the end faces 18, 20 of the filter body 10 prior to contact with the engagement surface 34 of each roller 28. The contact with the smooth roller deforms or "crushes" the very ends of the walls 14, thereby providing material of a greater thickness with which to form the end plugs 94. Alternatively, the outer surface of the smooth roller may be coated with a liquid such as water prior to engagement with the end faces 18, 20 to dampen and soften the ends of the walls 94, thereby reducing or eliminating unintended deformations thereto, such as shearing of the ends of the walls 14.

Figure 19:
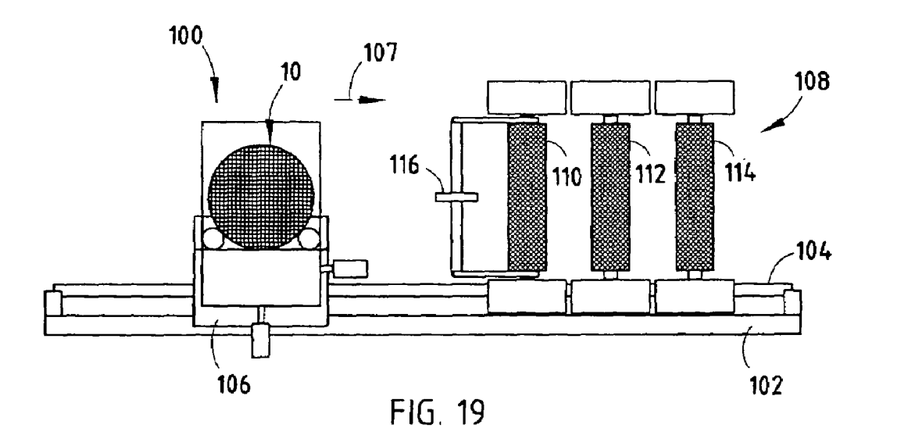
FIG. 19 is a front elevational view of a second alternative embodiment of the plugging apparatus.
Figure 20:
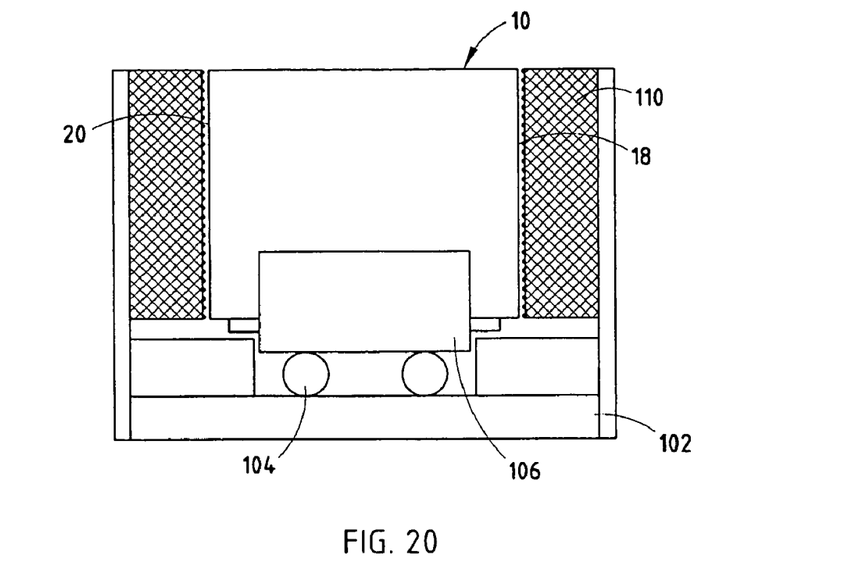
FIG. 20 is a side elevational view of the second alternative embodiment of the plugging apparatus.

It is foreseeable that alternative configurations of the plugging apparatus 16 may be provided in which multiple plugging steps are completed on the filter body 10. As best illustrated in FIGS. 19 and 20, a plugging apparatus 100 includes a supporting frame 102 and a pair of support rails 104 extending longitudinally therealong. A cradle assembly 106 is moveably supported on the support rails 104, and is adapted to support the filter body 10 thereon. A plurality of paired plugging rollers 108 are spaced longitudinally along the support rails 14 and are adjustably positioned so as to contact the end faces 18, 20 of the filter body 10 as the cradle assembly 106 is moved along the support rails 104 in a direction indicated and represented by directional arrow 107. In the illustrated example, the teeth-patterns, i.e., spacing and sizing of the teeth, differ from roller to roller. As by way of example, the first pair 110 of the plugging rollers 108 has a plurality of teeth that are slightly smaller in overall size and that have teeth with side walls that are less angled than those associated with the second pair of rollers, which are smaller in overall size and that have teeth with side walls that are less angled than those associated with the third pair of rollers 114. In this manner, the plugs in the end of the cells 22 may be formed by gradually deforming the ends of the walls 14, thereby reducing the sudden shearing forces as experienced by the ends of the walls 14 and reducing unwanted deformation thereof. In the illustrated example, a pilot roller 16 is positioned in front of the plugging rollers 108, and is utilized to provide alignment between the filter body 10 and the plugging rollers 108. It should be noted that the cradle assembly 106 of the plugging apparatus 100 may either be automatically or manually driven along the support rails 104.

Figure 21:
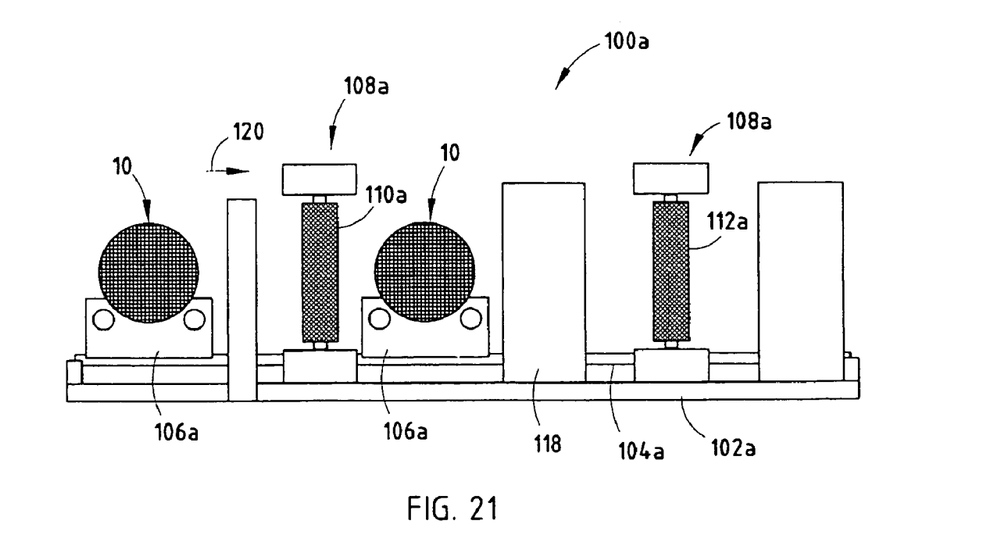
FIG. 21 is a front elevational view of a third alternative embodiment of the plugging apparatus.

The reference numeral 100a (FIG. 21) generally designates another embodiment of the plugging apparatus. Since the plugging apparatus 100a is similar to the previously described plugging apparatus 100, similar parts appearing in FIG. 20 and FIG. 19 respectively are represented by the same, corresponding reference numeral, except for the suffix "a" in the numerals of the latter. The plugging apparatus 100a includes the plugging rollers 108a interspaced with a plurality of inking or slurring rollers 118 along the length of the supporting frame 102a. The slurry rollers 118 are similar to the slurry rollers 90 as described above, however, other forms of rollers may be utilized, including smooth rollers, dampened rollers, and the like. In operation, the cradle assembly 106a is moved along the support rails 104a in a direction as indicated by directional arrow 120, during which the filter body 10 alternately contacts the plugging rollers 108 and the slurry rollers 118, thereby gradually deforming the ends of the walls 14, as well as gradually increasing the thickness of the plugs located within the cells 22.

In yet another alternative embodiment, a sheet-like molding member 120 (FIG. 20) is utilized in conjunction with a spherically-shaped pressing member 122 to manifold or plug the ends of the filter body 10. This particular approach allows the plugging process to compensate for inconsistent spacing of the cells 22 across the end faces 18, 20 caused during the manufacturing process of the filter body 10, and particularly during the drying process. This inconsistent spacing of the cells 22 is amplified as the size of the end faces 18, 20 thereof are increased, thereby making precise alignment of the crimping apparatus with the cells 22 more difficult. This is particularly noticeable as the end faces 18, 20 approach sizes exceeding 6 inches in diameter.

In the illustrated example, the molding member 120 includes an engagement surface 124 and an opposite surface 126. The engagement surface includes a plurality of outwardly extending teeth 128 similar to the teeth 36 as discussed previously herein. The sheet is preferably formed in a similar manner as described above with respect to the roller 28, and utilizing non-rigid resins such that the teeth 128 are flexibly resilient, such as a polyurethane or epoxy plasticized with a urethane function.

As illustrated, the pressing member 122 is preferably spherically-shaped, however, other geometrical configurations suitable for such use may be utilized. The pressing member 122 is constructed as a separate unit from the molding member 120, thereby allowing a localized force to be exerted on the molding member 120, wherein a localized force is one exerted on a given area that is less than the total surface area of an end face 18, 20 of the filter body 10. The pressing member 122 is preferably constructed of a substantially rigid, non-deformable material.

In operation, the engagement surface 124 of the molding member 120 is placed in contact with a localized region of the second end face 18 of the filter body 10 by contacting the opposite surface 126 of the molding member 120 with the pressing member 122, and such that the teeth 128 align with the second subset 24 of the cells 22. The pressing member 122 is then moved about the opposite surface 126 of the molding member 120 such that the engagement surface 124 has eventually been brought into contact with the entire second end face 20, thereby plugging the first subset 22 of the cells 22. Preferably, the pressing member 122 traces an outwardly-expanding spherical pattern 128 (FIG. 21) beginning at the center of the second end face 20. This same process is then applied to the first end face 18 of the filter body 10, thereby plugging the second subset 26 of the cells 22.

Figure 22:
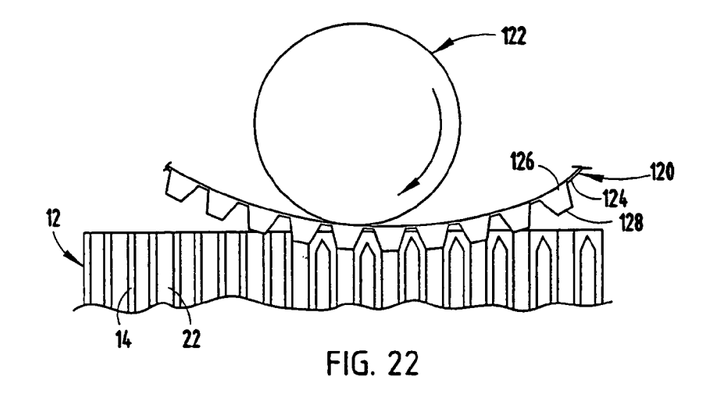
FIG. 22 is a side elevational view of a fourth alternative embodiment of the plugging apparatus.
Figure 23:
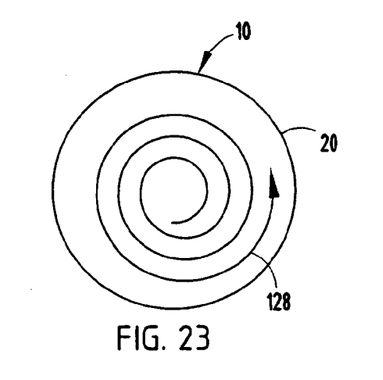
FIG. 23 is a side view of the extruded filter body and a tracing pattern of a pressing member.
Figure 24:
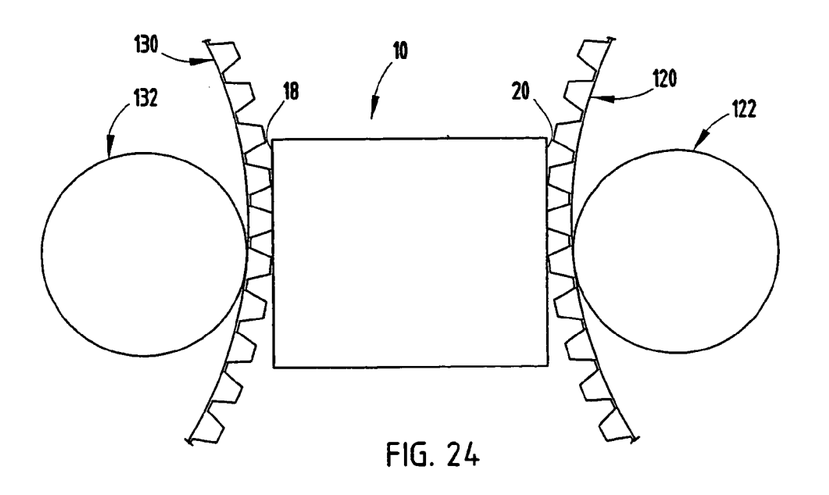
FIG. 24 is a side elevational view of a fifth alternative embodiment of the plugging apparatus.

Alternatively, the plugging process involving the molding member 120 (FIG. 22) and the pressing member 122 is simultaneously applied to the end faces 18, 20 of the filter body 10. In the illustrated example, a second molding member 130 and a second pressing member 132 are utilized to seal the second subset 26 of the cells 22, while the molding member 120 and the pressing member 122 are simultaneously utilized to seal the first subset 24 of the cell 22.

It will become apparent to those skilled in the art that various modifications to the preferred embodiment of the invention as described herein can be made without departing from the spirit or scope of the invention as defined in the appended claims. Thus, it is intended that the present invention covers the modifications and variations of this invention provided they come within the scope of the appended claims and the equivalents thereto.

The invention claimed is:

1. A method for plugging a subset of cells of a honeycomb structure having a plurality of open end cells extending therethrough, comprising:
providing at least one cylindrically shaped first roller and a shaft member for axially supporting the first roller, the first roller including an engagement surface having a plurality of outwardly extending teeth spaced along a length and about a circumference of the at least one first roller, wherein the teeth are spaced so as to engage a first subset of a total number of cells exposed on a first end of a honeycomb structure, the first roller being axially shiftable along a length of the shaft, thereby allowing the first roller to float along the shaft and align with the first subset of cells; and
rolling the engagement surface of the at least one first roller across the first end of the honeycomb structure with the teeth extending into the first subset of cells, thereby deforming the first end of the honeycomb structure and plugging a second subset of the total number of cells substantially different from the first subset of cells.

2. The method of claim 1, wherein the at least one first roller includes a plurality of first rollers spaced along the length of the shaft, and wherein the plurality of first rollers are shiftable with respect to one another, thereby allowing each first roller to independently float along the shaft and align with the first subset of cells.

3. The method of claim 1, further including:
providing at least one cylindrically shaped second roller including an engagement surface having a plurality of outwardly extending teeth spaced along a length and about a circumference of the at least one second roller, wherein the teeth are spaced so as to engage the second subset of cells exposed on a second end of the honeycomb structure; and
rolling the engagement surface of the at least one second roller across the second end of the honeycomb structure with the teeth of the at least one second roller extending into the second subset of cells, thereby deforming the second end of the honeycomb structure and plugging the first subset of cells.

4. The method of claim 3, wherein the step of rolling the engagement surface of the at least one second roller across the second end of the honeycomb structure includes offsetting the teeth of the second roller with respect to the teeth of the first roller by a distance equal to the width of one cell.

5. The method of claim 1, wherein the step of providing the at least one first roller includes providing the teeth of the at least one first roller such that the teeth are flexibly resilient, and wherein the step of rolling the engagement surface of the at least one first roller across the first end of the honeycomb structure includes allowing the teeth of the at least one first roller to elastically deform, thereby allowing the teeth to align with the first subset of cells.

6. The method of claim 1, wherein the step of providing the at least one first roller includes providing the teeth with a pyramidal-type shape.

7. The method of claim 1, further including:
applying a slurry to the first end of the honeycomb structure.

8. The method of claim 7, wherein the step of applying the slurry is completed prior to the rolling step.

9. The method of claim 1, wherein the step of providing the at least one first roller includes equally spacing the teeth along the length and about the circumference of the at least one first roller.

10. A method for plugging a subset of cells of a honeycomb structure having a plurality of open end cells extending therethrough, comprising:
providing at least one first molding member including an engagement surface and an opposite surface, the engagement surface having a plurality of outwardly extending teeth spaced along a length and a width of the at least one engagement surface, the teeth of the at least one first molding member being flexibly resilient and being spaced so as to engage a first subset of a total number of cells exposed on a first end of a honeycomb structure;
providing at least one first pressing member that is separate from the at least one first molding member;
contacting the engagement surface of the at least one first molding member across the first end of the honeycomb structure with the teeth extending into the first subset of cells while allowing the teeth of the at least one first molding member to elastically deform and align with the first subset of cells by exerting a localized force on the opposite surface of the at least one first molding member with the at least one first pressing member, thereby deforming the first end of the honeycomb structure; and plugging a second subset of the total number of cells substantially different from the first subset of cells.

11. The method of claim 10, wherein the at least one first pressing member comprises a curved surface, and wherein the step of contacting the engagement surfaces includes rolling the at least one first pressing member across the opposite surface of the at least one first molding member.

12. The method of claim 10, wherein the at least one first pressing member comprises a spherical shape, and wherein the step of contacting the engagement surfaces includes rolling the at least one first pressing member across the opposite surface of the at least one first molding member.

13. The method of claim 10, wherein the step of contacting the engagement surface includes tracing an outwardly-spiraling pattern with the at least one first pressing member across the opposite surface of the at least one first molding member.

14. The method of claim 10, further including:

providing at least one second molding member including an engagement surface and an opposite surface, the engagement surface of the at least one second molding member having a plurality of outwardly extending teeth spaced along a length and a width of the at least one second molding member, wherein the teeth are spaced so as to engage the second subset of cells exposed on a second end of the honeycomb structure;

providing at least one second pressing member that is separate from the at least one second molding member; and contacting the engagement surface of the at least one second molding member across the second end of the honeycomb structure with the teeth of the at least one second molding member extending into the second subset of cells by exerting a localized force on the opposite side of the at least one second molding member with the at least one second pressing member, thereby deforming the second end of the honeycomb structure and plugging the first subset of cells.

15. The method of claim 14, wherein the step of contacting the engagement surface of the at least one second molding member across the second end of the honeycomb structure includes offsetting the teeth of the at least one second molding member with respect to the teeth of the at least one first molding member by a distance equal to the width of one cell.

* * * * *